INVENTOR
MAARTEN BOGAARDT

United States Patent Office 3,425,904
Patented Feb. 4, 1969

3,425,904
STEAM COOLED EPITHERMAL OR FAST NUCLEAR REACTOR
Maarten Bogaardt, The Hague, Netherlands, assignor to Reactor Centrum Nederland, The Hague, Netherlands, an institute of the Netherlands
Filed Apr. 7, 1967, Ser. No. 629,156
U.S. Cl. 176—40    9 Claims
Int. Cl. G21c 15/00

ABSTRACT OF THE DISCLOSURE

A steam cooled, epithermal or fast nuclear reactor in which the fuel elements contain particles of a resonance absorber for thermal or epithermal neutrons so that accidental flooding of the reactor with water will not produce a super-critical condition.

---

The invention relates to a nuclear reactor, preferably an epithermal or a fast reactor, having fissile elements mounted in a pressure vessel, while fissile elements are cooled by mist or by dry steam passing along them, the said pressure vessel being provided with inlet and outlet connections for both water and steam and with means for mixing the led-in currents of water and steam in such a way as to form a mist suitable for cooling the said fissile elements.

A nuclear reactor of this general type is already known per se.

Such reactors show, however, several drawbacks in practice. Especially if a nuclear reactor of this kind is to be constructed as an epithermal reactor or as a so-called fast reactor, which means that little or no moderating materials may be contained in its reactor core, a serious problem presents itself. Thus, there is a certain problem which may occur under conditions in which the reactor becomes filled with water, since the level of the water that is used under normal circumstances for the production of a cooling steam mist or dry steam, might possibly rise. In that case the reactor could become super-critical, which is an undesirable condition. In order to surmount this drawback it is proposed according to the present application to compound the fissile material in such a way that the fissile material of which the fissile elements are composed will contain grains or particles of a substance having the quality of acting as a thermal or epithermal resonance-absorber.

In order to maintain these absorbers and to obviate the possibility that the resonance-absorbers will after some time be converted in such a way during the working of the reactor that their resonance-absorbing qualities diminish, preference is given to the use of discrete or shaped particles having such a diameter or maximum dimension that these discrete or shaped particles have a length of life which is as great as that of the fissile material in which they are contained. Diameters or maximum dimensions of approximately 0.5 mm., for instance, are in many cases quite sufficient for the purpose.

The result of using the resonance-absorbers described is that it is no longer troublesome if the reactor should become filled with water. The resonance field is then rendered inoperative by the presence of resonance-absorbers. Suitable absorber materials are: boron, gadolinium, samarium, hafnium, dysprosium and compounds like $UB_4$.

According to a further improvement the fissile elements are contained in elongated cooling pipes having their inlet ends pressed against apertures provided in a first pipe-plate mounted in the pressure vessel, on the steam inlet side of the latter. This construction has made it possible to mount the cooling pipes in the nuclear reactor in a simple manner.

According to a preferred embodiment atomizer pipes running coaxially with the cooling pipes are fitted in front of the entrance apertures of the latter in such a way that the outlet of each atomizer pipe is in sealed connection with the entrance aperture of the corresponding cooling pipe. The walls of these atomizer pipes are provided with small apertures. With this construction, it is no longer necessary, as was the case hitherto, to use elastic bellows to absorb the thermal variations in length of the cooling pipes. These elastic bellows deteriorate considerably in practice owing to the fact that they gradually lose their elasticity as a result of the combined effect of corrosion and structural variations in the material which are caused by the high temperature and the neutron flux.

An additional advantage obtained in this way is that for adaptation of the size of the atomizer apertures it is no longer necessary to have ready-adapted cooling pipes in stock, it being sufficient if suitably dimensioned atomizer pipes are available for the various capacities for which the reactor is to be constructed.

The atomizer pipes are preferably fixed into a second pipe-plate situated a certain distance away from the first one. This second pipe-plate forms part of the steam supply chest.

The reactor is, moreover, so constructed that the water inlet connections of the pressure vessel are in communication with the chamber between the first and the second pipe-plate, which chamber is positioned around the outer side of the atomizer pipes. This also renders it possible for the cooling water entering the reactor through the water inlet connections, when flowing upwards, to pass first through a separating screen on the outer side of the reactor, after which the cooling current can reverse its direction and flow downwards to the inner side of the said separating screen. At the end of this cooling stream, flowing in countercurrent, the cooling water finally enters the chamber situated between the two pipe-plates. With this arrangement it is also possible for the reactor core, enclosed by its outer jacket and bounded on its underside by the first pipe-plate, to be lifted bodily out of the reactor vessel.

On the upper side of the reactor core, near the outlet connections of the pressure vessel, a third pipe-plate is fitted inside the latter, this third pipe-plate having apertures designed to receive the outlet ends of the cooling pipes. This third pipe-plate is provided with a cooling pipe plate-holder situated near each cooling pipe.

Each cooling pipe plate-holder is preferably provided with resilient appliances for holding the cooling pipes in position in the longitudinal direction. These resilient appliances need not be of membrane form but may be very solid and amply dimensioned resilient elements which, since they are placed in a mass of surrounding liquid whose heat transmission coefficient is considerable, are well cooled.

According to an additional improvement of the construction described, each cooling pipe plate-holder is furthermore provided with a water separator of the hydrocyclone type connecting with the corresponding cooling pipe.

Since, according to this latter proposition, a large number of water separators are used, in fact as many water separators as the reactor has cooling pipes, the vertical height of these water separators is a good deal less than in reactors of prior art. The result of this is that the vertical dimension of the part of the reactor vessel which is situated over the reactor core can be considerably reduced.

A typical embodiment of the invention is described below in conjunction with the drawings in which.

Figure 1:
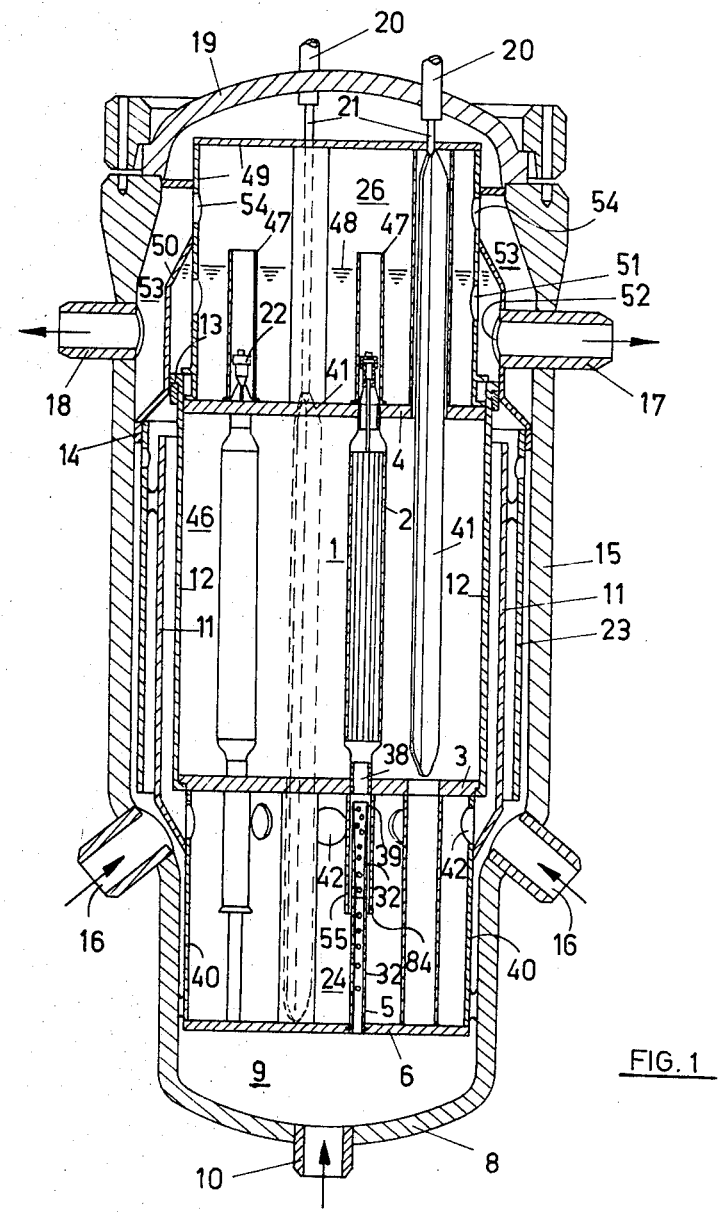
FIGURE 1 is a vertical cross-section of a nuclear reactor according to the invention.

Numeral 1 in FIGURE 1 represents the reactor core which is composed of a number of cooling pipes 2 with their underside resting on the so-called first pipe-plate 3 and with their upper side supported in the so-called third pipe-plate 4. Opposite the entrance 38 of each cooling pipe there is an atomizer pipe 5 whose outlet 39 issues forth opposite cooling pipe 2. Fitted around each atomizer pipe, which has small apertures 32, is a sleeve 55 projecting below pipe-plate 3 to which it is fixed. The atomizer pipes are incorporated in a so-called second pipe-plate 6 which, together with the vessel wall 8, forms the boundaries of a steam supply chest 9. This steam supply chest 9 is provided on its underside with a steam inlet connection 10. On the outer perimeter of pipe-plate 6 this pipe-plate is connected via wall 40 with a separating screen 11 extending vertically around the reactor. This reactor is provided with an outer jacket 12 which is fixed on its underside to a pipe-plate 3 and is connected on its upper side with pipe-plate 4. Surrounding the outer jacket 12 is an outer edge 13 by which the reactor core 1 can rest upon a surrounding ridge 14 which is fitted to the inner side of the vertical wall 15 of the reactor vessel. This wall of the reactor vessel continues downwards into a number of connections 16 through which cooling water can be supplied to the nuclear reactor. On its upper side the wall of the reactor vessel has at least two outlet apertures 17 and 18 which serve respectively for the discharge of water and steam. A cover 19 closes the upper side of the reactor vessel. Fitted inside this cover are a number of packing glands 20 through which operating rods 21 project, which operating rods are used for moving the control rods 41 of the reactor up and down. Each cooling pipe is provided on its upper side with a cooling pipe plate-holder 22. Mounted around each cooling pipe plate-holder 22 is a chimney 47 which projects above the liquid level 48. Mounted on top of pipe-plate 4 is a box 49 which is surrounded on its outer side by wall 50. Near outlet 17, apertures 51 and 52 respectively are provided in the wall of box 49 and in wall 50, through which the segregated water from 47 can reach outlet 17. Numeral 23 denotes a heat shield which is interposed between wall 15 of the reactor vessel and the separating screen 11.

The operation of the plant is as follows: During operation steam is admitted to the reactor through connecting apertures 10, which steam passes into the steam supply chest 9. From this steam supply chest the steam distributes itself over the atomizer pipes 5. The water that is supplied through apertures 16 first flows upwards on either side of the heat shield 23. It subsequently changes its direction near ridge 14 and flows downwards along the outer jacket 12 of the nuclear reactor until chamber 24 is reached via apertures 42 in wall 40, which chamber 24 is situated between pipe-plates 3 and 6. Here, this water penetrates through apertures 32 which are provided in atomizer pipes 5. As a high speed of flow reigns inside the atomizer pipes, the water that penetrates through these apertures into the atomizer pipes becomes atomized and is led upwards as mist through cooling pipes 2.

The supply of the water to be atomized is so adjusted that the water level in the lower part of the reactor fluctuates between the underside of pipe-plate 3 and the orifices 84 of packing glands 55.

Any water that is carried along with the steam mist through the cooling pipes is separated in chamber 26 and accumulates inside the reservoir formed by wall 50 and pipe-plate 4.

Passing through apertures 51 and 52, this water is subsequently carried to the outlet connection 17, to be led into a heat exchanger not shown in the drawing. After having been cooled in the heat exchanger the water returns to the reactor, flowing into it again through connections 16.

Having absorbed, during its upward flow along the fissile elements in cooling pipes 2, the major part of the heat developed in the reactor, the steam passes out of the reactor core through chimneys 47. Water separators, not shown in the drawing, may be mounted on these chimneys. The steam, possibly after having passed through a special drying process, reaches chamber 53 via apertures 54. From here the dried steam is discharged through connection 18, to flow into a heat exchanger not shown in the drawing.

If, owing to an abnormal operating condition, for instance temporary interruption of the steam supply during starting or stoppage of operation of the reactor, or as a result of damage to a part of the reactor jacket 12, water penetrates into the chamber 46 which is positioned around the cooling pipes, there will still be no danger whatsoever of the reactor becoming uncontrollably supercritical as a result of over-moderation. This is achieved in that the fissile material of which the fissile elements are composed contains particles of a material having the property of acting as a thermal or epithermal resonance-absorber, such as boron, samarium, hafnium, dysprosium or compounds of these elements. Preference is given to discrete or shaped particles with a diameter or maximum dimension ranging from 0.3 to 0.7 mm.

Figure 2:
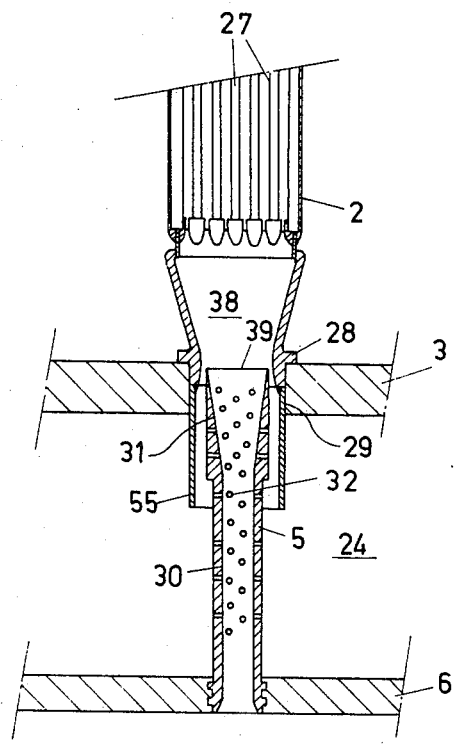
FIGURE 2 is a fragmentary view, on an enlarged scale, showing the connection between the atomizer pipes and the underside of the cooling pipes.

FIGURE 2 shows on an enlarged scale how the atomizer pipes 5 connect with cooling pipes 2. Numeral 27 gives a diagram of the fissile rods positioned in cooling pipe 2. These fissile rods are mounted in such a way that channels through which the steam mist moves upwards are left open between the vertical cooling pipes. The cooling pipes are provided on their underside with a wall 28 connecting with apertures 29 which are provided in pipe-plate 3, at each position where there is an atomizer pipe. These atomizer pipes are fixed, for instance, by being rolled into pipe-plate 6 and show an initially cylindrical form 30, followed by a conical form 31. Both in the cylindrical part and in the conical part of each atomizer pipe 5, apertures 32 are provided through which the cooling water contained in chamber 24 can penetrate into the interior of the atomizer pipes.

Figure 3:
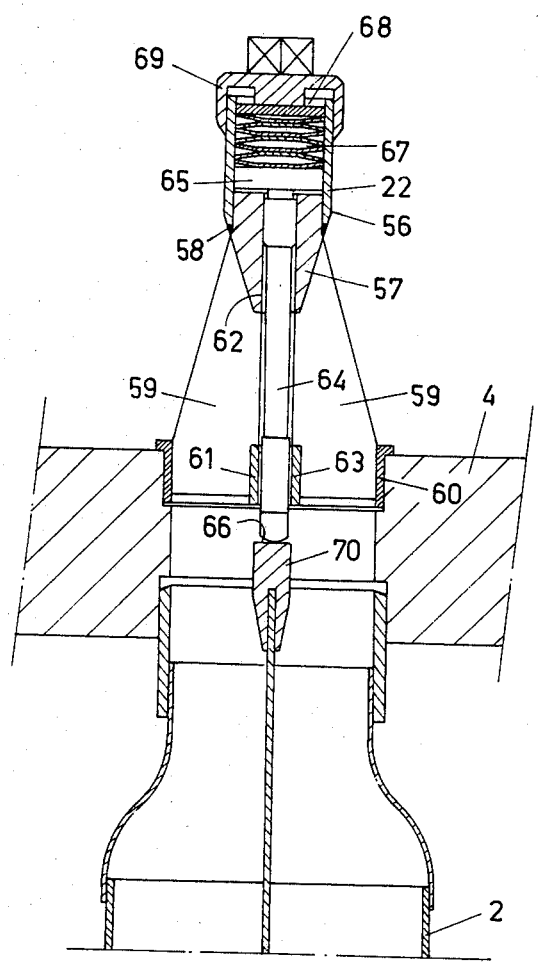
FIGURE 3 is a fragmentary view, on an enlarged scale, showing a cooling pipe plate-holder.

FIGURE 3 shows the top end of cooling pipe 2 which is laterally supported in pipe-plate 4 in such a manner that this plate is pressed down upon it by means of a cooling pipe plate-holder 22. This plate-holder consists of a jacket 56 with a cone-shaped bottom 57 fixed to it. This connection may be effected, for instance, by means of a screw-thread which is subsequently secured in a reliable manner, e.g., by means of an edge weld 58. Bottom 57 is fixed on its underside to a set of bracket plates 59 which in turn are connected with a bush 60 fixed into pipe-plate 4. Both in bottom 57 and in a smaller bush 61 which is connected with the central part of each of the bracket plates 59, a drilled hole is provided, 62 and 63 respectively. A pin 64 is passed through these drilled holes. Pin 64 has on its upper side a stamper 65 and on its underside a pressure surface 66. Since there is a cup spring 67 over stamper 65, which cup spring 65 can be tensioned by means of the locking plate 68 and the screw cap 69, the pressure surface 66 can exert an elastic force upon a pressure element 70 positioned centrally in the top part of cooling pipe 2.

Figure 4:
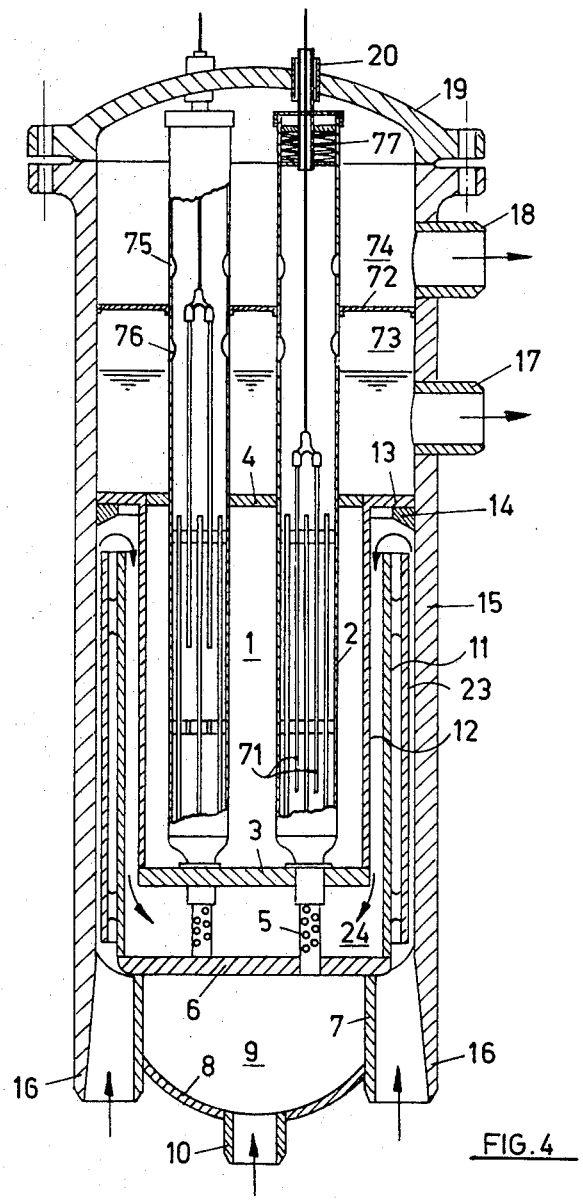
FIGURE 4 is a variant of FIGURE 1, in which the reactor is provided with finger control rods.

FIGURE 4 shows a variant of the reactor according to FIGURE 1. The difference as compared with the last-mentioned embodiment is that finger control rods 71 are used for control, as a result of which the height of the reactor vessel can be still further reduced.

Furthermore, the part of the cooling pipes which is situated above the bottom connection is formed with a constant diameter over the entire further length of the pipes, which simplifies assembly and dismantling of the cooling pipes. A partition 72 divides the chamber inside the reactor vessel over the core into two parts 73 and 74. Through apertures in each cooling pipe wall the steam can escape to chamber 74, to be discharged through steam outlet 18.

Slits 76 provide the possibility of discharging segregated drops of water into chamber 73.

Water separation can be promoted in a variety of ways not illustrated in the drawing, e.g. by providing the inner side of cooling pipe 2 locally with grooves in the form of a screw-thread, which grooves impart a rotational movement to the steam mist as a result of which the drops of water are flung against the inner wall of the cooling pipe and pass outwards through slits 76. The upper edge of each cooling pipe is held in position here, too, by means of cup springs 77, shown only in outline in FIGURE 4.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What is claimed is:
1. In a nuclear reactor of the kind operable with neutrons having energies at least as high as epithermal neutrons, said reactor having fuel elements containing fissile material mounted in a pressure vessel, the said fuel elements being cooled by mist or by dry steam passing along them, the said pressure vessel being provided with inlet and outlet connections for both water and steam and with means for mixing the led-in currents of water and steam in such a way as to form a mist suitable for cooling the said fuel elements, the improvement which comprises particles of a resonance absorber for epithermal or fast neutrons, having a maximum dimensions of 0.3 mm. to 0.7 mm., included in said fissile material, said particles containing a material selected from the group consisting of boron, gadolinium, samarium, hafnium, dysprosium and compounds thereof, said fuel elements being contained in elongated cooling pipes having their inlet ends pressed against apertures provided in a first pipe-plate mounted in the pressure vessel, on the steam inlet side of the latter, and further comprising atomizer pipes running coaxially with the cooling pipes, said atomizer pipes being fitted in front of the entrance apertures of the latter in such a manner that the outlet of each atomizer pipe is connected with a narrow clearance to the entrance aperture of the corresponding cooling pipe.

2. A nuclear reactor according to claim 1, wherein the walls of the said atomizer pipes are provided with small apertures.

3. A nuclear reactor according to claim 1, wherein said atomizer pipes are fitted into a second pipe-plate spaced from the first pipe-plate, which second pipe-plate forms part of a steam supply chest.

4. A nuclear reactor according to claim 3, wherein the water inlet connection of the said pressure vessel is in communication with a chamber between the first and the second pipe-plate, positioned around the outer side of the said atomizer pipes.

5. A nuclear reactor according to claim 1, wherein a third pipe-plate is introduced into the said pressure vessel at a point near the outlet connections of the latter, which third pipe-plate is provided with apertures designed to receive the outlet ends of cooling pipes.

6. A nuclear reactor according to claim 5, wherein each cooling pipe is provided with a cooling pipe pressure element situated near its top end.

7. A nuclear reactor according to claim 6, wherein each cooling pipe plate-holder is provided with resilient means holding the cooling pipes longitudinally in position.

8. A nuclear reactor according to claim 6, wherein each cooling pipe plate-holder is provided with a water separator of the hydro-cyclone type connecting with the corresponding cooling pipe.

9. A nuclear reactor according to claim 7, wherein the cooling pipes project above the reactor core with an extension having the same external diameter as the cooling pipe component situated inside the reactor core.

References Cited
UNITED STATES PATENTS

| | | | |
|---|---|---|---|
| 3,150,053 | 9/1964 | Goldman et al. | 176—54 |
| 3,275,521 | 9/1966 | Schluderberg et al. | 176—40 |
| 3,287,227 | 11/1966 | Ackroyd et al. | 176—93 |
| 3,334,019 | 8/1967 | Bogaardt et al. | 176—68 X |

REUBEN EPSTEIN, *Primary Examiner.*

U.S. Cl. X.R.

176—54, 93, 68